United States Patent
Sipido et al.

(10) Patent No.: US 9,302,610 B2
(45) Date of Patent: Apr. 5, 2016

(54) MOTOR VEHICLE HEADLIGHT WITH ENERGY ABSORBING FEATURE

(71) Applicant: Ford Global Technologies, LLC, Dearborn, MI (US)

(72) Inventors: Antje Sipido, Cologne (DE); Manfred Marik, Leverkusen (DE); Julian Ott, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 14/160,825

(22) Filed: Jan. 22, 2014

(65) Prior Publication Data
US 2014/0204603 A1 Jul. 24, 2014

(30) Foreign Application Priority Data

Jan. 22, 2013 (DE) .......................... 10 2013 200 975
Jan. 22, 2013 (DE) .......................... 10 2013 200 976

(51) Int. Cl.
*B60Q 1/00* (2006.01)
*B60Q 1/04* (2006.01)

(52) U.S. Cl.
CPC .......... *B60Q 1/0408* (2013.01); *B60Q 1/0491* (2013.01)

(58) Field of Classification Search
CPC .............. B60Q 1/0491; B60Q 1/0425; B60R 2021/343; B60R 21/34
USPC ................................................. 362/459–549
See application file for complete search history.

(56) References Cited

U.S. PATENT DOCUMENTS

| 6,450,676 B2 | 9/2002 | Maeda et al. | |
|---|---|---|---|
| 2006/0072332 A1* | 4/2006 | Arlon | B60Q 1/0491 362/509 |
| 2013/0088886 A1* | 4/2013 | Eckert | B60Q 1/0416 362/528 |

FOREIGN PATENT DOCUMENTS

| DE | 10156240 A1 | 6/2003 |
|---|---|---|
| DE | 60111878 T2 | 4/2006 |

OTHER PUBLICATIONS

German Patent and Trademark Office, Search Report for corresponding German Patent Application No. DE 10 2013 200 976.3 mailed Sep. 17, 2013.

* cited by examiner

*Primary Examiner* — William Carter
(74) *Attorney, Agent, or Firm* — Raymond Coppiellie; Brooks Kushman P.C.

(57) ABSTRACT

A headlight for motor vehicles including a box-shaped housing, a light unit arranged in the housing, a front pane sealing the housing to the front relative to the direction of travel, and mountings provided on the housing for connecting the housing to the vehicle. Impact protection is provided by a rupture device that has at least one flexurally sensitive region of reduced wall thickness in the wall of the housing. The flexurally sensitive region at least partially extends transversely to the direction of the possible impact loading. A rupture element supported against the vehicle structure is provided on at least one point of the flexurally sensitive region. A targeted continuous rupturing of the flexurally sensitive region is provided by the rupture element in an impact with an unprotected road user.

18 Claims, 6 Drawing Sheets

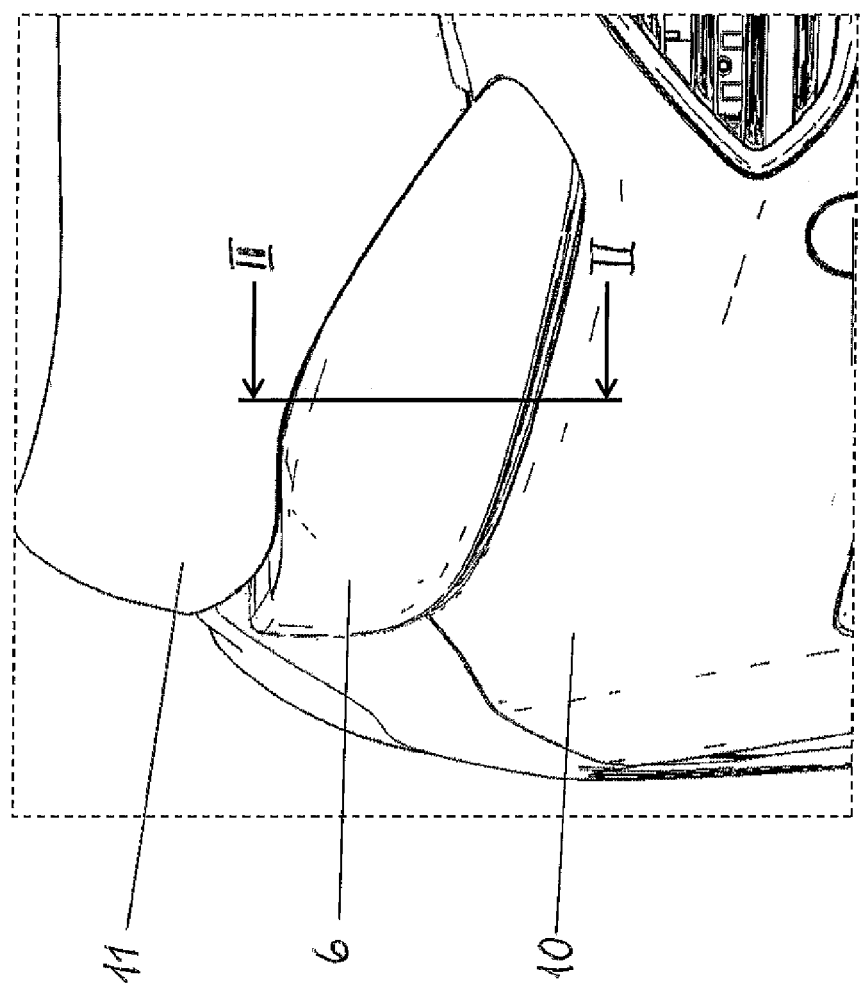

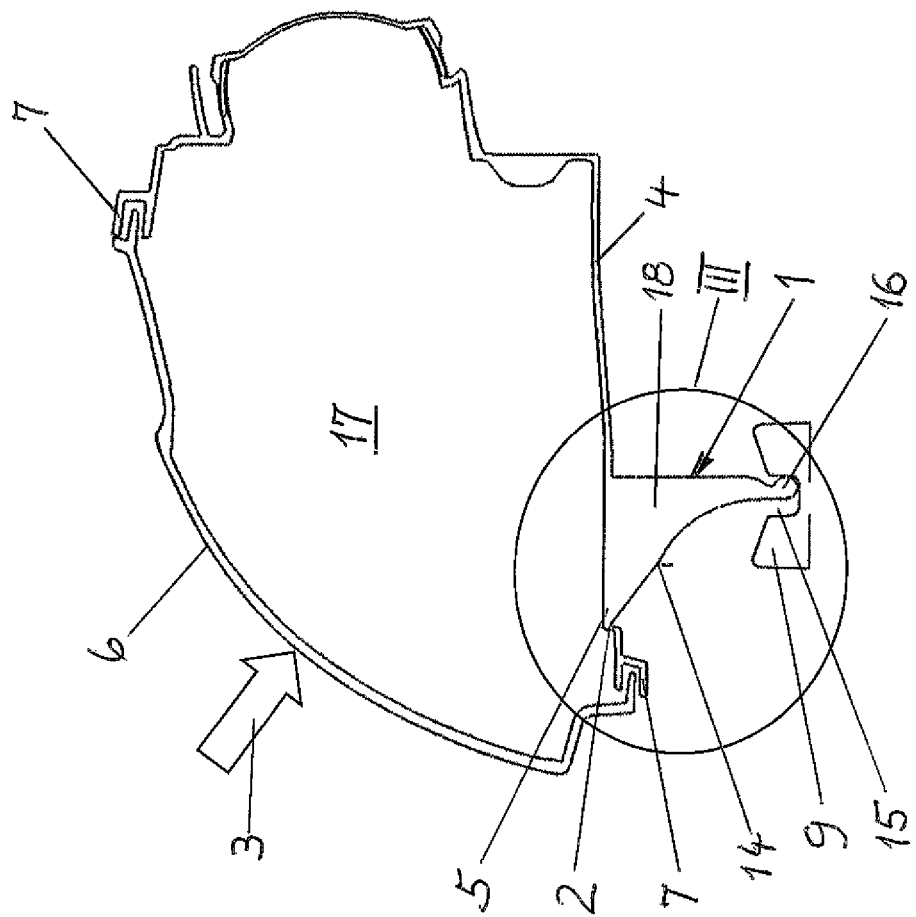

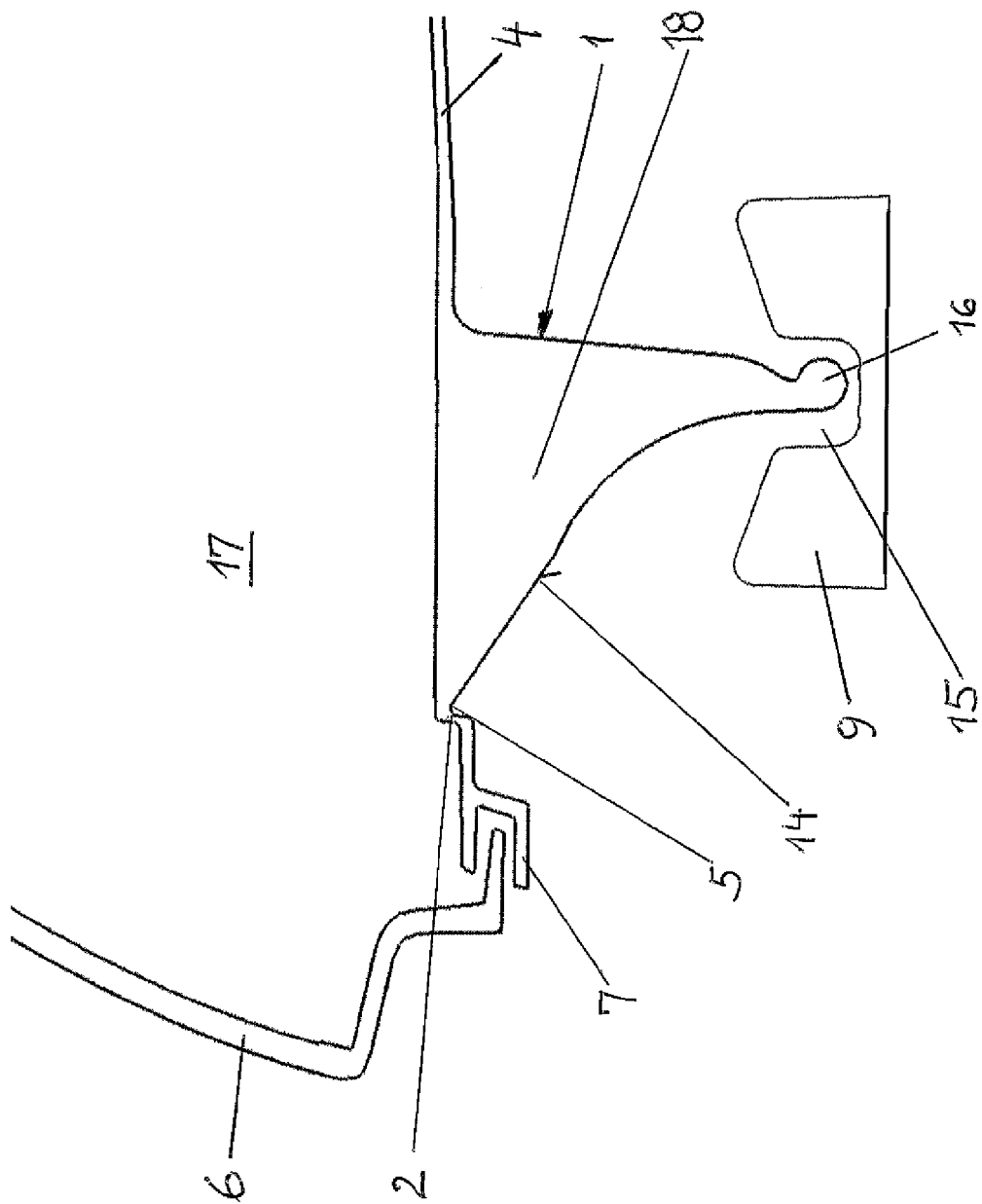

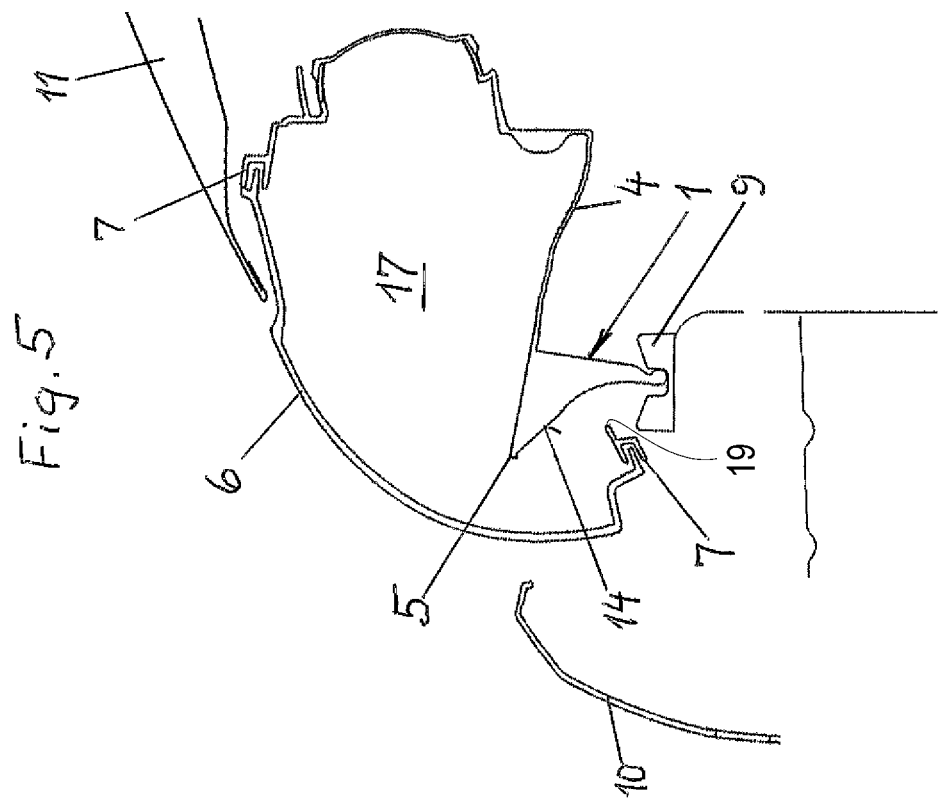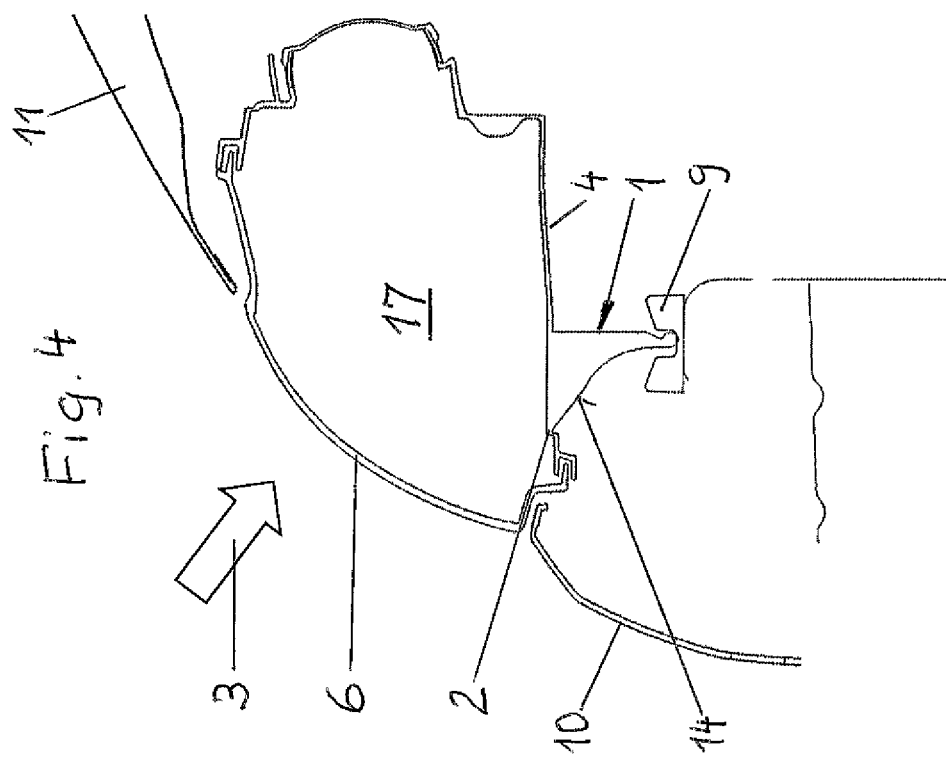

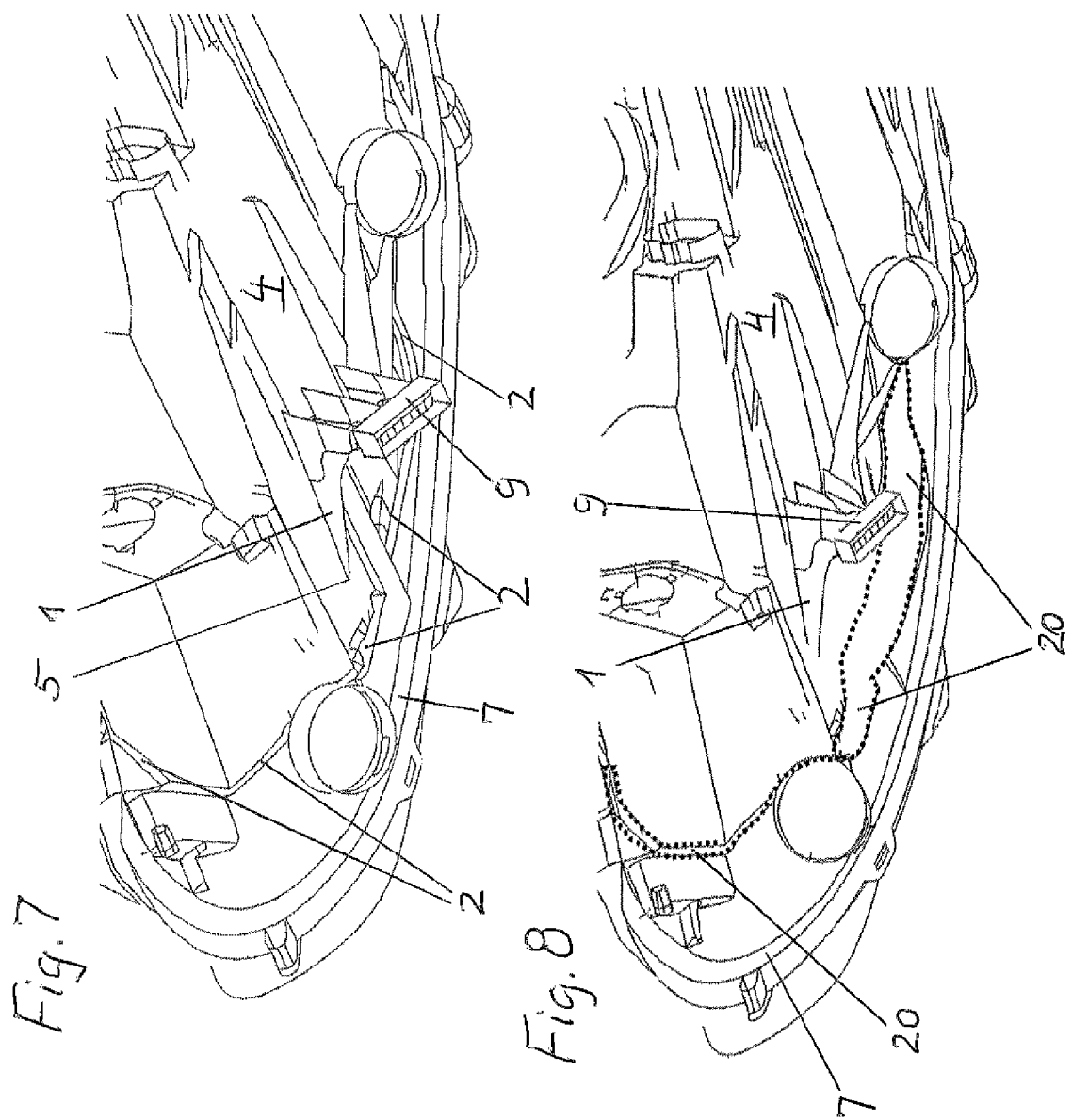

MOTOR VEHICLE HEADLIGHT WITH ENERGY ABSORBING FEATURE

CROSS-REFERENCE TO RELATED APPLICATIONS

This application claims foreign priority benefits under 35 U.S.C. §119(a)-(d) to DE 10 2013 200 975.5 filed Jan. 22, 2013 and DE 10 2013 200 976.3 filed Jan. 22, 2013, which are hereby incorporated by reference in their entirety.

TECHNICAL FIELD

This disclosure relates to a headlight, in particular for motor vehicles, comprising a dimensionally stable, box-shaped housing, a light unit arranged in the housing, a translucent front pane sealing the housing to the front relative to the direction of travel, mountings provided on the housing for connecting the housing to the vehicle structure as well as impact protection integrated in the housing.

BACKGROUND

In the event of a front impact with unprotected road users, such as pedestrians, cyclists and the like, the currently known headlights constitute a hard impact region due to their design. The closed, box-shaped construction provides a high degree of dimensional stability to the often large-volume housings, which has a disadvantageous effect on impact protection. In the event of an impact against the headlight, generally the mountings on the vehicle structure rupture first dissipating only a small proportion of the impact energy. The dimensionally stable housing is displaced as a whole in the direction of impact. Large-volume headlights are only able to yield slightly because they come into contact with the vehicle structure surrounding said headlights after a short displacement path due to the limited deformation spaces to the rear and below the headlights. The headlights as a whole form a relatively hard impact surface and carry a substantial risk of injury to unprotected road users.

To improve the impact protection, it is already known (DE 10 2009 030 087 A1) to provide predetermined breaking points in the headlight housing. In the event of impact loading, the housing breaks at the predetermined breaking point and collapses. As a result, the headlight as a whole yields slightly but the loads are not concentrated in a targeted manner onto the predetermined breaking points. This leads to local deformation but the ruptures do not spread sufficiently far enough for the housing to remain substantially intact and dimensionally stable. If the fixings of the headlight break first, which may arise in the known headlights, the entire housing is displaced without a sufficient level of loading being reached on the predetermined breaking points. Also in this case, the housing remains intact and only contributes to a small degree to effective impact protection.

In another known headlight (DE 103 52 903 A1) the housing is configured as an energy-absorbing deformation part. The upper wall comprises parallel wall with portions of reduced thickness in the form of wall strips extending parallel to the vehicle longitudinal axis. In this case, specific material weak points are formed along the thin wall strips that collapse in the event of an impact to provide energy absorption. Also in this construction, the headlight housing moves in the direction of impact very rapidly and comes into contact with the adjacent vehicle structure. The level of loading on the housing is dissipated by the remaining components acted upon during the impact, for example by the engine hood, to such an extent that the required initial breakage in the headlight housing is not produced. The housing remains at least partially intact and does not contribute, or only contributes insufficiently, to effective impact protection.

The object of the invention, therefore, is to provide a headlight that has increased flexibility relative to the known headlights and produces a considerable improvement to the impact protection.

SUMMARY

According to one aspect of this disclosure, impact protection is provided as a rupture device. The rupture device has at least one strip-shaped, flexurally sensitive region of reduced wall thickness in the wall of the housing. The flexurally sensitive region at least partially extends approximately transversely to the direction of the possible impact loading. A rupture element supported against the vehicle structure is provided on at least one point of the flexurally sensitive region and a targeted, continuous rupturing of the flexurally sensitive region is achieved by means of the rupture element.

The rupture device is integrated in the dimensionally stable headlight housing that results in a targeted concentration of the impact loading in the flexurally sensitive regions of the housing. The flexurally sensitive regions are designed to serve as predetermined breaking points.

Preferably, the flexurally sensitive region is formed by a housing step that has a reduced wall thickness in comparison with the remaining housing.

The rupture device is particularly effective when the flexurally sensitive region is formed in the base of the housing. An optimal deformation of the headlight housing is possible by means of this measure.

In another embodiment, the rupture element is configured as a flexurally rigid foot. One end of the foot is fixedly connected to the outer face of the housing wall, preferably to the lower face of the housing base, and the other end is supported against the vehicle structure. The headlight housing is displaced against the downwardly oriented flexurally rigid foot if the impact loading acts on the housing. The flexurally rigid foot counteracts the displacement and introduces the loading into the housing base because the lower end thereof is fixed to the vehicle structure. This leads to the deflection of the housing base initially in the region of the flexurally rigid foot where the housing step ruptures locally and spontaneously. The rupturing continues in a targeted and continuous manner after rupturing locally.

The flexurally rigid foot is arranged directly behind the housing step to form a predetermined breaking point. As a result, a particularly rapid and effective rupturing effect is possible.

Moreover, the flexurally rigid foot is preferably provided with a reinforcing rib that is oriented counter to the potential direction of impact.

The reinforcing rib provided on the flexurally rigid foot is provided with an inclined oblique portion leading away from the housing wall to further improve the rupturing process. The breaking edge is pushed in the case of an impact and breaks at a predetermined breaking point. The housing wall connected to the flexurally rigid foot is distorted abruptly and specifically into the housing interior. The maximum distortion is located in the region of the reinforcing rib of the foot, and in particular, directly on the flexurally sensitive housing step. The predetermined breaking point spontaneously ruptures over its entire length.

The connecting flange provided on the housing for mounting the front pane, extends directly in front of the flexurally rigid foot and forms a flexurally rigid breaking edge. The flexural rigidity of the connecting flange is affected by its relatively large cross section. Due to these features, the bending load is concentrated in the housing step.

The end of the flexurally rigid foot supported against the vehicle structure preferably has a rounded head which is located in a depression of a component of the vehicle structure and in the case of an impact is pivotably guided in the depression.

The invention is illustrated by way of example in the drawings and described hereinafter in detail with reference to the drawings.

BRIEF DESCRIPTION OF THE DRAWINGS

FIG. 1 shows a detail of the front face of a passenger vehicle with an installed headlight, FIG. 2 shows a section along the line II-II of FIG. 2;

FIG. 3 shows the region III of FIG. 2 in an enlarged view;

FIG. 4 shows the same section through the headlight as in FIG. 2 but with the adjacent body parts and namely in an undeformed state, FIG. 5 shows the same view as in FIG. 4 in the deformed state after an impact;

FIG. 7 shows the headlight according to FIGS. 1 to 5 in a slightly enlarged view than the detail of FIG. 6 with the flexurally sensitive housing step before an impact; and FIG. 8 shows the same view as in FIG. 7 after an impact with the ruptured housing step.

DETAILED DESCRIPTION

Figure 6:
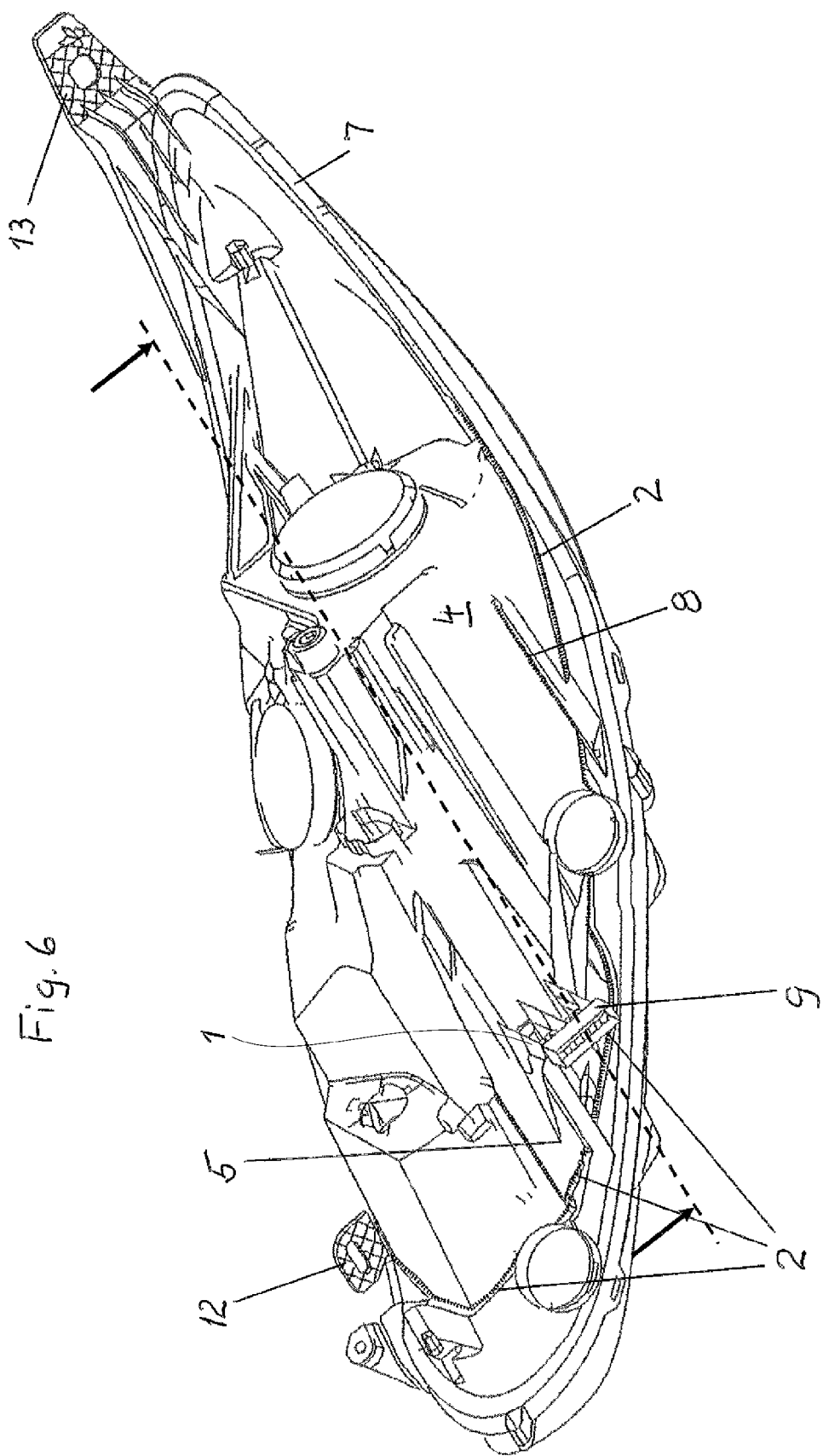
FIG. 6 shows the headlight according to FIGS. 1 to 5 in a perspective view.

A detailed description of illustrative embodiments is disclosed below. It is to be understood that the disclosed embodies are examples of the disclosure that may be embodied in various and alternative forms. The figures are not necessarily to scale and some features may be exaggerated or minimized to show details of particular components. The specific structural and functional details of the disclosed embodiments are not to be interpreted as limiting, but merely as a representative basis for teaching one skilled in the art how to practice the invention.

A detail of the right-hand front end of a passenger vehicle is shown in FIG. 1 of the drawings, in which the front pane 6 of a headlight may be seen, the lower side thereof being adjacent to the fender 10 and the upper side being adjacent to the engine hood 11.

In the section according to FIG. 2 of the drawings, essential details of the headlight housing 17 that contribute to the impact protection may be seen.

The headlight housing 17 is configured as a plastics part and at its upper end and lower end in each case has a connecting flange 7 that serves for the reception and the fixed retention of the front pane 6.

A downwardly oriented flexurally rigid foot 1 forms the core part of the rupture device is provided on the housing base 4. The upper end of the foot 1 is fixedly connected to the downwardly facing outer face of the housing base 4, the lower end of the foot 1 is supported against the vehicle structure. A component 9 is located on the vehicle structure and is provided with a depression 15 that supports the rigid foot 1. The lower end of the flexurally rigid foot 1 is supported against the component 9 and is provided with a rounded head 16 which in the case of an impact is pivotably guided in the depression 15.

A flexurally sensitive region is formed by a housing step 2 and is provided directly in front of the connecting flange 7 located on the housing base 4, in the direction of the front pane 6. The housing step 2 has a reduced wall thickness in comparison with the remaining housing and serves as a predetermined breaking point in the case of impact loading.

The flexurally rigid foot 1 serves as a rupture element for the housing step 2 and is provided with an integrally formed reinforcing rib 18. The reinforcing rib 18 on the side facing the housing step 2 has an oblique portion 14 leading away from the housing base 4. The end 5 of the oblique portion 14 of the reinforcing rib 18 entering the housing base 4 extends directly adjacent to the housing step 2.

The individual structural details of the rupture device are particularly clearly visible in FIG. 3, which shows the rupture device in an enlarged view.

In FIGS. 4 and 5, the particularly advantageous effect of the rupture device according to the invention is illustrated. In these two figures, apart from the headlight housing 17 the adjacent motor vehicle parts are also shown with the top the engine hood 11 at the top and the fender 10 at the bottom.

In the case of an impact in the direction of the arrow 3 shown in FIG. 4, the housing step 2 formed as predetermined breaking point initially ruptures in the region of the flexurally rigid foot 1. The flexurally rigid breaking edge is formed by the connecting flange 7 that engages the edge of the front pane 6. The breaking edge is displaced downwardly and, as a result, continuously forces the housing base 4 upwards into the headlight housing 17. During the course of the deformation, the housing base 4 is pushed into the position shown in FIG. 5, so that in the case of an impact the front pane is able to move back a relatively long distance.

The rupturing of the housing step 2 is a flexurally sensitive region starting in the region of the rupture element that is configured as a flexurally rigid foot 1. The rupture then continues at high speed along the predetermined breaking point and, depending on the position of the flexurally rigid foot 1, on one or on both sides.

Targeted rupturing of the housing may be achieved at the end 5 of the oblique portion 14 of the reinforcing rib 18, even in the event of low impact energy. The flexural rigidity of the housing is considerably reduced and the continuing deformation of the housing base 4 leads to the formation of a rupture along the housing step 2 across the entire width of the housing base 4. The housing base 4 including the flexurally rigid foot 1 is pushed into the headlight housing 17 to absorb a large proportion of the impact energy and at the same time opens up a large deformation path. The increasing deformation of the housing base 4 leads to further ruptures along cross-sectional projections 8 in the form of edges and ribs extend perpendicular to the bending axis. As a result, energy is continuously dissipated and opens up a further deformation path.

In FIG. 6, the headlight housing is illustrated in a perspective view. The housing step 2 of reduced wall thickness is shown along a dotted line on which the rupturing takes place, proceeding from the rupture element formed as a flexurally rigid foot 1.

In FIGS. 7 and 8, the headlight housing is shown before and after an impact. FIG. 8 shows in detail how the rupture 20 is formed along the housing step 2 in detail.

The headlight functions in the front region of a motor vehicle as an effective deformation element and results in a considerable improvement to the impact protection of unprotected road users.

In the event of an impact, the functional parts of the vehicle arranged behind the headlight housing are damaged less and/or not damaged at all. The rear mountings 13 remain in position because the impact energy is substantially absorbed and dissipated inside the headlight housing. Depending on the impact, the front mounting 12 may break or even remain in position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A headlight for a motor vehicle comprising:
   a housing, a light unit arranged in the housing, a translucent front pane sealing the housing, and mountings provided on the housing for connecting the housing to a vehicle structure;
   a rupture device having at least one region of reduced wall thickness in a wall of the housing, the region at least partially extending approximately transversely to a direction of a possible impact loading; and
   a foot depending from the housing at a location adjacent to the region and including a rib extending from the region to a lower portion of the foot, wherein during an impact the rib presses against the region causing the region to rupture.

2. The headlight as claimed in claim 1, wherein the region is formed in a base of the housing.

3. The headlight as claimed in claim 1, wherein the foot has a second end supported against the vehicle structure.

4. The headlight as claimed in claim 3, wherein the second end of the foot has a rounded head that is located in a depression defined by a component of the vehicle structure and is pivotably guided in the depression in an impact.

5. The headlight as claimed in claim 1, wherein the region is formed by a housing step that has a reduced wall thickness compared to an adjacent portion of the housing.

6. The headlight as claimed in claim 5, wherein the foot is arranged directly behind the housing step forming a predetermined breaking point.

7. The headlight as claimed in claim 6, wherein in an impact the foot is pushed into the housing wall causing the predetermined breaking point to break forming a breaking edge in a direction of an end of the foot.

8. The headlight as claimed in claim 1, wherein a connecting flange, which is provided on the housing and which serves for mounting the front pane extends directly in front of the foot.

9. The headlight as claimed in claim 8, wherein the connecting flange forms a flexurally rigid breaking edge.

10. A headlight for a motor vehicle comprising:
    box-shaped housing, a light unit arranged in the housing, a translucent front pane sealing the housing and mountings provided on the housing for connecting the housing to a vehicle structure;
    a rupture device having at least one flexurally sensitive region formed by a housing step that has a reduced wall thickness compared to an adjacent portion of the housing, the flexurally sensitive region at least partially extends approximately transversely to a direction of a possible impact loading; and
    a foot arranged directly behind the housing step and supported against a vehicle structure, the foot forming a predetermined breaking point of the rupture device such that in an impact the predetermined breaking point breaks and forms a breaking edge in the direction of an end of the foot supported against the vehicle structure and, as a result, pushes the housing wall that is connected to the flexurally rigid foot into the housing, wherein the foot has at least one reinforcing rib oriented counter to a potential direction of impact and wherein an oblique portion leading away from the housing wall is provided on the reinforcing rib, onto which the breaking edge is pushed in an impact and breakage of the predetermined breaking point pushes the housing wall, to which the flexurally rigid foot is connected, into the housing.

11. A headlight comprising: a housing; a light in the housing; a translucent pane sealing the housing; a rupture device having a region of reduced wall thickness in a wall of the housing and extending transversely to a direction of possible impact; and a foot depending from the housing at the region and including a rib extending between the region and a bottom of the foot, the rib pressing against the region causing rupture during impact.

12. The headlight of claim 11, further comprising mountings provided on the housing for connecting the housing to a vehicle structure.

13. The headlight of claim 12, wherein the foot depends from the housing such that the bottom of the foot pivotally engages the vehicle structure.

14. The headlight of claim 13, wherein the bottom of the foot has a rounded head that is disposed in a depression defined by a component of the vehicle structure and is pivotably guided in the depression in an impact.

15. The headlight of claim 11, wherein the region is formed by a housing step that has a reduced wall thickness compared to an adjacent portion of the housing.

16. The headlight of claim 15, wherein the foot is arranged directly behind the housing step forming a predetermined breaking point.

17. The headlight of claim 16 wherein, in an impact, the foot is pushed into the housing wall causing the predetermined breaking point to break forming a breaking edge in a direction of an end of the foot.

18. The headlight of claim 11 wherein the housing further includes a connecting flange that secures the pane to the housing.

* * * * *